July 22, 1941.  W. L. HENRY  2,250,160
FASTENER
Filed March 9, 1940
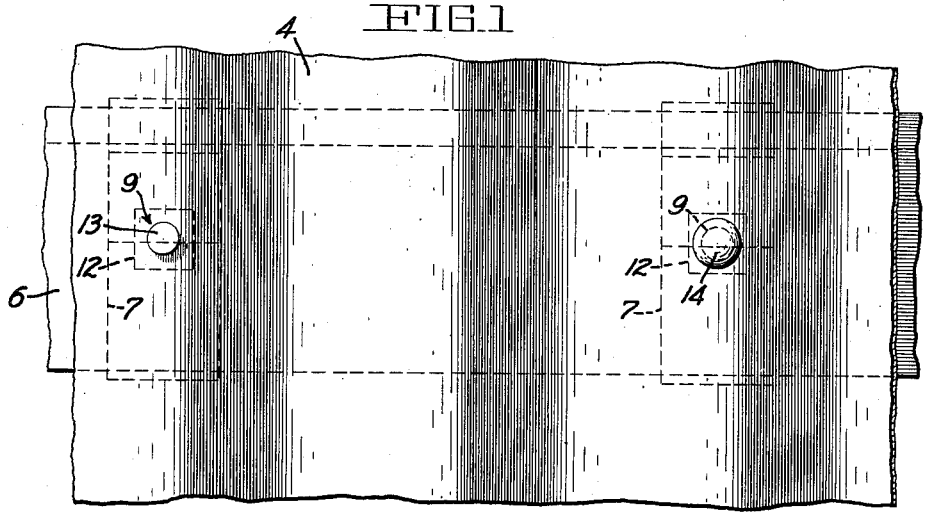
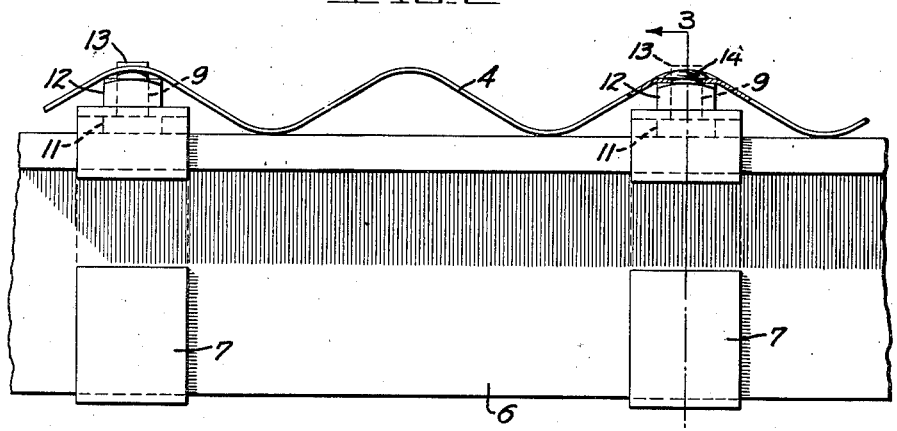
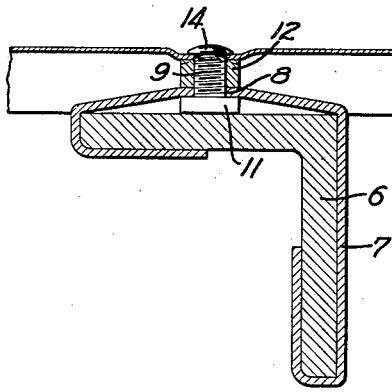
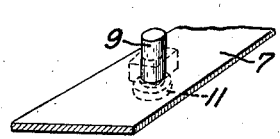
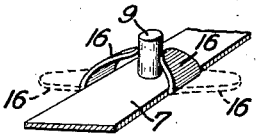
INVENTOR
William L. Henry
BY
Harry Schroder
ATTORNEY Patented July 22, 1941

2,250,160

UNITED STATES PATENT OFFICE 2,250,160

FASTENER

William L. Henry, Oakland, Calif.

Application March 9, 1940, Serial No. 323,193

1 Claim. (Cl. 189—37)

This invention relates to devices for connecting members together.

It is an object of the invention to provide an improved fastener for mounting sheet material on supporting structures.

Another object of the invention is to provide a fastener particularly adapted to the securing of corrugated sheet metal on building framing where it serves as siding or roofing.

A further object of the invention is to provide a fastener of the class described which is relatively inexpensive to manufacture.

The invention possesses other objects and features of advantage which, together with the foregoing, will be specifically set forth in the detailed description of the invention hereunto annexed. It is to be understood that the invention is not to be limited to the specific form thereof herein shown and described as various other embodiments thereof may be employed within the scope of the appended claim.

Referring to the drawing:

Figure 1 is a top plan view showing the improved fastener of my invention employed in securing a section of metal sheet to a section of structural bar.

Figure 2 is a front elevational view of the structure shown in Figure 1. A portion of the view is broken away and a portion is shown in vertical section so as to more clearly disclose the construction.

Figure 3 is a vertical sectional view of a portion of the structure of Figure 2. The plane in which the view is taken is indicated by the line 3—3 of Figure 2.

Figure 4 is a perspective view showing a modified form of spacer.

Figure 5 is a perspective view showing a further modified form of spacer.

Describing my invention in detail, while my improved fastener may be used for joining any type of sheet metal to an underlying supporting structure, I prefer to describe its use in mounting corrugated sheet metal 4 to the roof beams or side frame bars 6 of structures such as buildings. The fastener comprises a strip of metal 7, which is readily bendable, having intermediate its ends an aperture 8 in which is inserted a threaded stud 9 having an integral head 11 which lies below the strip 7. A nut 12, which is threadedly engaged with the stud 9 serves to secure the latter in the aperture 8. The stud, as is shown in the left-hand portion of Figure 2, extends a small distance above the top of the nut 12 to form a riveting projection 13. If desired, the threads on the stud 9 may be dispensed with, as shown in Figure 4, and a spacer 10 having a plain drilled hole 10' may be slipped thereover as shown by the dotted lines in the aforementioned figure.

The fastener is attached to the bar 6 by laying the head 11 on the web of the bar with the stud 9 extending upwardly or outwardly and then bending the opposite ends of the strip 7 so that they are folded under the outer and bottom edges, respectively, of the bar. The corrugated sheet 4, which has previously been provided, in several of the ridges thereof, with apertures spaced apart corresponding to the spacing of the fasteners on the bar 6, is now placed so that the riveting projections 13 pass through the sheet apertures. The workman now rivets over the projections 13 to form rivet heads 14 which bind the sheet between them and the tops of the nuts 12. Such riveting, when properly done, will form a water-tight joint so that moisture cannot pass from one side of the sheet 4 to the other through the sheet apertures. Since the nut 12, which is backed up by the bar 6, forms an unyielding anvil, it will be seen that very few blows are required on the projection 13 to form a satisfactory tight riveted joint.

In Figure 5 I have shown the strip 7 provided with a pair of transversely opposed ears 16 which are bent upwardly until their ends engage the side of the stud. These bent ears serve the same purpose as the spacer 10 and the nut 12 in holding the sheet 4 a predetermined distance above the bar 6.

I claim:

A fastener, for securing a piece of sheet material, having an aperature therein, to an underlying member, comprising a cylindrical stud having an enlarged head resting on a surface of said underlying member, a strip of material having therein an opening through which said stud passes and overlying the head of the stud, said strip of material extending radially from the stud and being engaged with the underlying member at a point remote from the position of the stud, and said strip of material further having a pair of integral ears projecting from opposite edges thereof which are each bent upwardly to positions wherein their outer ends engage the side of said stud, said piece of sheet material having one side thereof resting on the upper ends of said ears with an extended portion of the stud passing through said aperture and projecting beyond the other side thereof, and said extended portion of the stud being riveted to overlie the said other side of the sheet material to secure the latter between the riveted portion of the stud and the ends of said ears.

WILLIAM L. HENRY.